United States Patent [19]
Iida et al.

[11] Patent Number: 5,950,213
[45] Date of Patent: Sep. 7, 1999

[54] INPUT SHEET CREATING AND PROCESSING SYSTEM

[75] Inventors: Hiroshi Iida; Eiichi Yamauchi, both of Kanagawa, Japan

[73] Assignee: Fuji Xerox Co., Ltd., Tokyo, Japan

[21] Appl. No.: 08/802,839

[22] Filed: Feb. 18, 1997

[30] Foreign Application Priority Data

Feb. 19, 1996 [JP] Japan .................................. 8-031062

[51] Int. Cl.⁶ ................................................ G06F 17/30
[52] U.S. Cl. ........................................................ 707/505
[58] Field of Search .................................. 707/505, 506, 707/507, 530, 509, 508, 504, 500, 526

[56] References Cited

U.S. PATENT DOCUMENTS

| 5,428,694 | 6/1995 | Betts et al. | 382/317 |
| 5,752,053 | 5/1998 | Takakura et al. | 395/766 |
| 5,765,005 | 6/1998 | Maruoka et al. | 395/766 |

FOREIGN PATENT DOCUMENTS

| 62-135976 | 6/1987 | Japan . |
| 63-8889 | 1/1988 | Japan . |
| 63-242060 | 10/1988 | Japan . |
| 3-174660 | 7/1991 | Japan . |
| 4-232564 | 8/1992 | Japan . |
| 7-114610 | 5/1995 | Japan . |

*Primary Examiner*—Joseph H. Feild
*Assistant Examiner*—Alford W. Kindred
*Attorney, Agent, or Firm*—Finnegan, Henderson, Farabow, Garrett & Dunner, L.L.P.

[57] ABSTRACT

An input sheet system for reading an input sheet on which an instruction from a user is described, acquiring the instruction from the user on the basis of the read result, and performing information processing according to the instruction. When a form creator creates the appearance of a form by arranging symbols of software components registered on a component library on a form image, a form editor automatically creates a form document describing the location relationship of the symbols. When an input sheet with user's instructions filled in is read into the system, the system determines the processing order of the software components corresponding to the symbols on the basis of the location relationship of the symbols described on the form document and carries out the processing in this order.

7 Claims, 12 Drawing Sheets

FIG. 12

PROCESSING LIST

| SYSTEM FUNCTIONAL FRAME | INPUT | OUTPUT | PROCESSING ORDER |
|---|---|---|---|
| FILING A | APPENDED DOCUMENT | STORE, LIST = LIST FORM<br>TAKE OUT = DOCUMENT IMAGE | A - 1 |
| FILING B | APPENDED DOCUMENT | STORE, LIST = LIST FORM<br>TAKE OUT = DOCUMENT IMAGE | B - 1 |
| FILING C | OUTPUT FROM FILING B | STORE, LIST = LIST FORM<br>TAKE OUT = DOCUMENT IMAGE | B - 2 |
| PRINTER α | OUTPUT FROM FILING A | PRINTER α | A - 2 |
| PRINTER β | OUTPUT FROM FILING A | PRINTER β | A - 2 |
| PRINTER γ | OUTPUT FROM FILING C | PRINTER γ | B - 3 |

FIG. 13

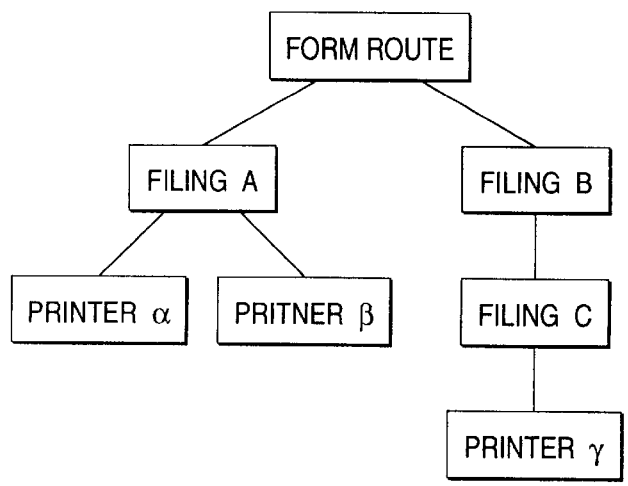

FIG. 14

QUESTIONNAIRE FORM SHEET

Q1. CHECK YOUR AGE AND OCCUPATIONAL CATEGORY.

| AGE | ☐ TWENTIES ☐ THIRTIES | ☐ FOURTIES | ☐ FIFTIES OR MORE | |
|---|---|---|---|---|
| OCCUPATIONAL CATEGORY | • ASSISTANT SECTION CHIEF | • SECTION CHIEF | • VICE-CHIEF | • CHIEF OR ABOVE • OTHERS |

☐ RESEARCH DEPT.   ☐ AA BUSINESS        ☐ SE/MSS/SP   ☐ MAIN OFFICE DEPT.
☐ DEVELOPMENT DEPT. ☐ BB BUSINESS        ☐ CE/FS       ☐ OTHERS
☐ PRODUCTION DEPT.  ☐ SYSTEM BUSINESS

Q2. WHAT IMPRESSED YOU MOST?

SPJ

Q3. CHECK YOUR UNDERSTANDING DEGREE.

| AA SYSTEM | • 1 (LOW) | • 2 | ■ 3 (MEDIUM) | • 4 | • 5 (HIGH) |
| BB SYSTEM | ☐ 1 (LOW) | ☑ 2 | ☐ 3 (MEDIUM) | ☐ 4 | ☐ 5 (HIGH) |

THANK YOU FOR YOUR COOPERATION FOR QUESTIONNAIRE.

0 0 6 0 7 3 1 6

INPUT SHEET CREATING AND PROCESSING SYSTEM

BACKGROUND OF THE INVENTION

1. Field of the Invention

The present invention relates to an input sheet system for reading an input-sheet on which an instruction from a user is described, acquiring the instruction from the user on the basis of the read result, and performing information processing according to the instruction.

2. Description of the Related Art

A mark sheet system is one of previously known input systems for an information processing system. The mark sheet system has advantages that it can represent the instructions from a user only using a pencil and does not require any special input device. For this reason, the mark sheet system has been used for the purposes of totaling of questionnaires and marking of tests, etc.

The mark sheet system, however, has drawbacks that layout of checking items on a mark sheet is strictly limited, thus making it impossible to create the mark sheet having the layout which can be easily understood by users.

There is proposed, in Japanese Patent Unexamined Publication No. Hei. 7-114610, an input device for an information processing system using an instruction document form which can sufficiently use the advantages of a mark sheet system and freely create the layout of checking items.

In this conventional system, an instruction document form 500 as shown in FIG. 16, for example is previously made and stored in a data base. In this case, the form 500 is provided with a form identifier (form ID) 510 so that the data on the form substance are correlated with the form ID. The form 500 contains check dots 520 by which a user selects desired items and numeral filling spaces 530 to be filled by numerals, etc. The output of the form 500 on a medium such as paper is called an instruction sheet which corresponds to mark sheet paper. Further, the data base stores information of analyzing the form 500 (analyzing information and a processing program for input by the form 500 so as to correspond to the form 500.

For this instruction document, the user checks the check dots 520 and fills in numeral the numeral filling spaces 530. The conventional device reads the instruction document filled out by the user using a scanner. Next, it detects the form ID 510 from a scanned image and takes out, from the data base, the analysis information and processing program for the instruction document form corresponding to the ID. Then, it detects the checking dots and the fill-in contents by the user on the basis of the image analysis of the scanned image according to the analysis information, and executes the processing program using the detection result as a parameter, thus performing the information processing instructed by the user.

After the input operation is performed using the instruction document form shown in FIG. 16, a "Printing Request Questionnaire Form" document will be outputted according to the manner of a print format, output destination and output format of numerical data selected by the user (for a facsimile number filled in by the user when the facsimile is selected as an output destination).

However, in the conventional device, simultaneously when the instruction document form is made, the processing program describing the processing contents when the instruction document corresponding to the form has been read must be made. If not, the instruction document could not be used as a user input medium. In addition, the instruction document form itself, which can be made using a word processor, for example, can be relatively easily formed by persons other than specialists of software. On the other hand, the processing program, which must be described in a predetermined language such as the C-language, could be made only by persons having technical knowledge of software to a certain degree. Thus, in the conventional device, it was difficult for the persons other than specialists of software to create the instruction document form usually and configure the user input system using it.

SUMMARY OF THE INVENTION

The present invention has been made in order to solve such a problem. An object of the present invention is to provide an input sheet system which can perform information input without making analysis information and processing programs corresponding to a form individually from the form and using the input sheet created by the form (in the present invention, the medium used for fill-in from a user such as the above instruction document is referred to as "input sheet") and perform the processing according to the input.

In order to attain the above object, the present invention provides an input sheet system for reading an input sheet filled out by a user to acquire an input sheet image and performing processing according to user's input information obtained by visually analyzing the input sheet image, the input sheet system comprising: a library in which software components each executing each function of the system are registered; form creating means for creating a form of the input sheet by locating a symbol of each of the software components; form registering means for registering the form thus created; input sheet creating means for creating an input sheet on the basis of the form; input sheet reading means for reading the input sheet filled out by a user; form deciding means for deciding a form corresponding to the input sheet on the basis of a reading result of the input sheet; and input processing means for acquiring a subordinate relationship among the software components on the basis of a location relationship of the symbols exhibited on the decided form and processing the user's input information exhibited on the input sheet in accordance with the subordinate relationship.

BRIEF DESCRIPTION OF THE DRAWINGS

FIG. 12 is a table showing a processing list corresponding to the-input sheet shown in FIG. 11.

FIG. 13 is a view showing the structure of form document data corresponding to the input sheet shown in FIG. 11.

FIG. 14 is a view showing an example of the form of a questionnaire.

DETAILED DESCRIPTION OF THE PREFERRED EMBODIMENT

Figure 1:
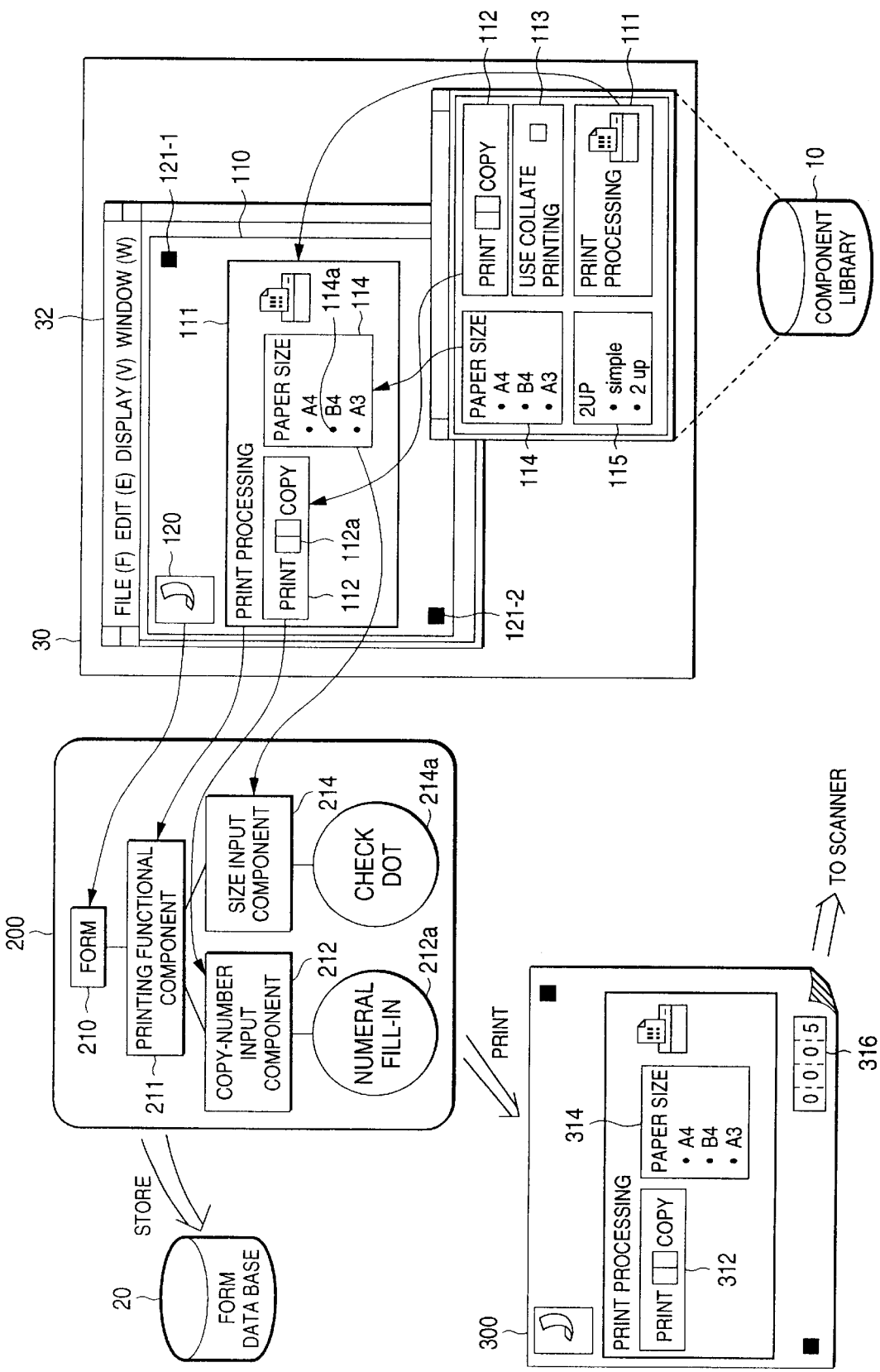
FIG. 1 is a block diagram showing the process of creating an input sheet form in an input sheet system according to the present invention.

Now referring to the drawings, an explanation will be given of an embodiment of an input sheet system according to the present invention.

The input sheet system according to this embodiment can be structured on a general computer system. This input sheet system includes two main functions of making the form of an input sheet and inputting/processing information using the input sheet created from the form. These functions will be explained below.

Referring to FIG. 1, an explanation will be given of the form of an input sheet in this embodiment.

In this embodiment, software components for executing the functions provided by an input sheet system are previously registered in a component library 10. Each software component has data of a processing program describing the function and a symbol image (hereinafter referred to as "symbol") in display. These software components are previously made by persons making the components (specialists of software, e.g. providers of the input sheet system according to-this embodiment).

The form is created on a display screen 30 of a computer by a form creator. First, the form creator actuates a form editor to open a form creating window 32. Then, within the window 32, a form image 110 of a blank sheet of paper (which means the state free from a print processing functional frame 111 and frames 112 and 114 within the frame 111) with only a logo 120 and registration marks 121-1 and 121-2 (the mark at the lower right corner is not shown) displayed at four corners is displayed. The method of actually using the logo 120 and registration marks 121, which represent that a document at issue is the form of an input sheet, will be described later.

The form creator then opens a component library window 34. Within the window 34, a list of symbols 111-114 of respective software components registered in the component library 10 is displayed. In this embodiment, the symbol of each of the respective software components adopts the format describing the explanation or graphic representing the functions of the software components within the frame. Therefore, in the following explanation, each symbol may be referred to as "frame". For example, symbol 111 is referred to as "print processing functional frame", and symbol 112 is referred to as "copy-number input frame".

In this embodiment, the software components are classified into two categories of system functional components and inputting components. The- system functional components serve to execute the service functions (e.g. filing function and printing function) provided by the present system, and the inputting components serve to read the result of fill-in for the input sheet by a user. For example, within the component library window 34, the print processing functional frame 111 is a symbol of the system functional component for the print processing function, and the copy-number input frame 112 is a symbol of the inputting component for reading the number of copies of printing.

The system functional component has processing parameters necessary to execute the processing function. For example, in order that the print processing-function component executes printing, a printer name, number of copies, paper size, etc. must be set. The print processing functional component can set them as processing parameters. The component creator sets default values of all processing parameters for the system functional components and supplies them to the user (form creator). It is needless to say that the form creator can customize these parameters.

On the other-hand, the inputting component contains a recognition unit having functions of recognizing several kinds of inputs. The usable recognition units include a check dot unit (see dot 114a within a paper size inputting frame 114) and a check box unit (see collate input frame 113) for recognizing the presence or absence of check fill-in, a numeral recognition unit (see a numeral fill-in space 112a within the copy-number inputting frame 112) for visually recognizing a filled-in numeral, a free fill-in unit (not shown) for taking in the fill-in by the user as image data, etc. In this embodiment, as described later in detail, where the inputting frame (e.g. copy-number inputting frame 112) is located within the system functional frame (e.g. print processing frame 111), the user's fill-in for the inputting frame is used as a processing parameter of the system functional frame including the inputting frame. Specifically, in this embodiment, the inputting component mainly serves as means for setting the processing parameters for the system functional component. For this purpose, each inputting component describes the processing parameter to be input of a certain system functional component.

In this embodiment, it is preferable to make such a configuration as can open the component library window for each component group relative to each of the services of the system.

Therefore, where a form of the input sheet for inputting the instruction of print processing is to be created, a form creator opens the window 34 exhibiting a component group relative to the printing function. Using a pointing device, the symbol within the component-library window 34 is selected and copied on the form image 110 within the form creating window 32 by "drug and drop". In the example of FIG. 1, the form creator first copies the print processing function frame 111 on the form image 110 and expands the frame to a suitable size. Subsequently, the form creator copies the copy-number inputting frame 112 and the paper size inputting frame 114 within the print processing function frame 111.

When the form creator assembles the form image 110 on the form creating window 32, form document data 200 are created within the form editor. Specifically, the form editor creates the form document data 200 describing the relationship among the frames located on the form image 110. The form document data 200 describe software components 211, 212 and 214 (or pointers for the component substance in the library 10), size of each frame and their locations, and also describe the relationship among the frames.

The relationship among the respective frames is described by the location relationship of the frames on the form image 110. The location relationship can be described by e.g. an inclusion relationship among the frames. Specifically, when the form creator arranges the copy-number inputting frame 112 within the print processing function frame 111, the print processing functional frame 111 and the copy-number inputting frame 112 are correlated with each other in a relationship "the frame 112 is included within the frame 111". In place of the inclusion relationship, an overlapping relationship among the frames may be used. In this case, the form editor reads the frame to be overlapped each frame by the form creator in assembling the form and correlates the frames with each other on the basis of the overlapping relationship. Such correlation, in the case of using the inclusion relationship among the frames, can be realized in a manner that an external frame has a pointer to an internal frame whereas it, in the case of using the overlapping relationship among the frames, can be realized in a manner that each frame has a pointer to the other frame overlapped with itself.

The form document data 200 created within the form editor, as shown, has a tree-shaped structure including the respective components 211, 212 and 214 for the form route 210. The form route 210 indicates that the data at issue represent an input sheet. The components 211, 211 and 214 are coupled in accordance with the above relationship among the frames.

The form document data 200 thus formed describes the apparent image of the form in term of the relationship among the frames and also prescribes the functional coupling among the respective software components displayed on the form. As described later, in this embodiment, subordinate relationship (hierarchical or parent-child relationship) among the software components is prescribed, and the order of processing and input/output relationship of the software components are determined.

The form document data 200 can include the processing parameters for each component. In order that the form creator can customize the processing parameters, it is preferable to describe the processing parameters on the form document data 200.

The form document data 200 thus created are supplied with a form identifier (form ID or FID) and stored in a form data base 20. The grant and management of the FID are executed by an FID server (see FIG. 2). The form document data 200 stored in the form data base 20 will be retrieved by the FID.

The form document data created by the form editor or stored in the form data base 20 are taken out if required and the input sheet is created on the basis of the data taken out. The input sheet, which represents the form image described on the form document data, may be printed on a sheet of paper or displayed on a display device. In FIG. 1, the input sheet 300 is printed on the sheet of paper. On the input sheet 300, an FID 316 of the form which is a source of the input sheet 300 is printed.

The input sheet 300 thus created is distributed to each user (hereinafter referred to as "sheet user"). The sheet user uses the input sheet when he wants to execute the printing. Then, the sheet user fills in a desired number of copies in a numeral fill-in space within a copy-number inputting frame 312 and selects to check a desired paper size from check dots within a paper size inputting frame 314. Thus, the input sheet 300 subjected to the fill-in by the sheet user has become an instruction inputting document instructing the processing that the user wants for the present system to execute, i.e., "printing of a designated copy number and paper size". The sheet user appends a document to be subjected to printing to the filled-out input sheet 300 and causes them to be read by a scanner.

Now referring to a view explaining the outline of processing and flowcharts of FIGS. 3 to 10, an explanation will be given of inputting of information using the input sheet and processing based on the input information.

Figure 2:
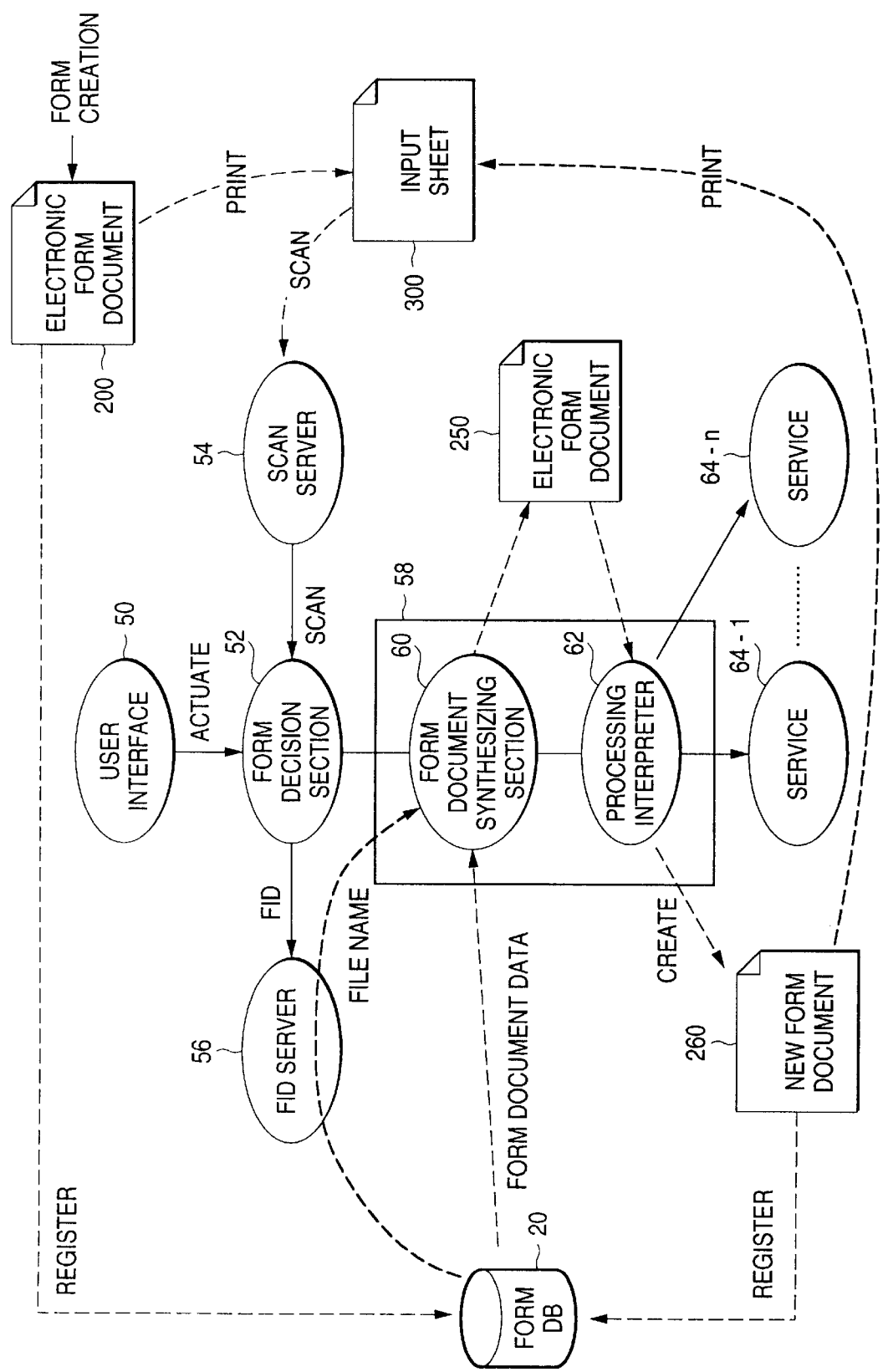
FIG. 2 is a block diagram showing the outline of information input using an input sheet and processing based on the inputted information in the input sheet system according to the present invention.

As shown in FIG. 2, the form document data (which are electronic data) 200 created by the form editor are stored (registered) in the form data base (DB) 20. The form document data 200 are read from the form DB 20 if required, and on the basis of the read data, the input sheet 300 is created and distributed to the sheet user. The sheet user fills in necessary items on the input sheet 300, and inputs information to the system using the filled-out input sheet.

Figure 3:
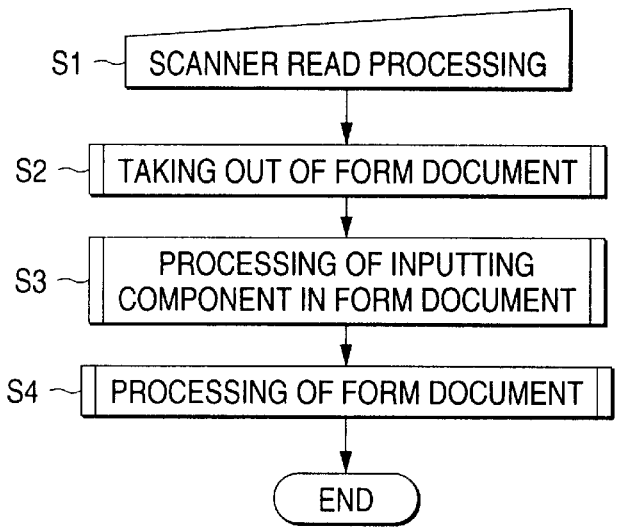
FIG. 3 is a flowchart showing the outline of the process of information input using an input sheet and processing based on the inputted information.

The entire process of inputting of information by the filled-out input sheet and processing of the inputted information is shown in FIG. 3. As seen from FIG. 3, the process mainly includes the steps of reading the filled-out input sheet by a scanner (S1), specifying the form document which is an original of the input sheet from the scanning result to take out the form document data (S2), processing inputting components using the-form document data taken out (i.e. acquiring the fill-in result by the user) (S3), and executing the processing specified by the user using the input sheet (S4). Taking, as an example, the input sheet (or form) for instructing the print processing shown in FIG. 1, a detailed explanation will be given of the respective steps.

In step S1, the sheet user appends the document to be subjected to printing to the filled-out input sheet 300, and causes the set of documents to be read from a scan server 54. The scan server 54 supplies the acquired image data to a form decision section 52.

In step S2, the form decision section 52 decides whether the image data received from the scan server 54 are a form and further specifies the form. It is assumed that the form decision section 52 is actuated from a user interface 50 of the present system.

Figure 4:
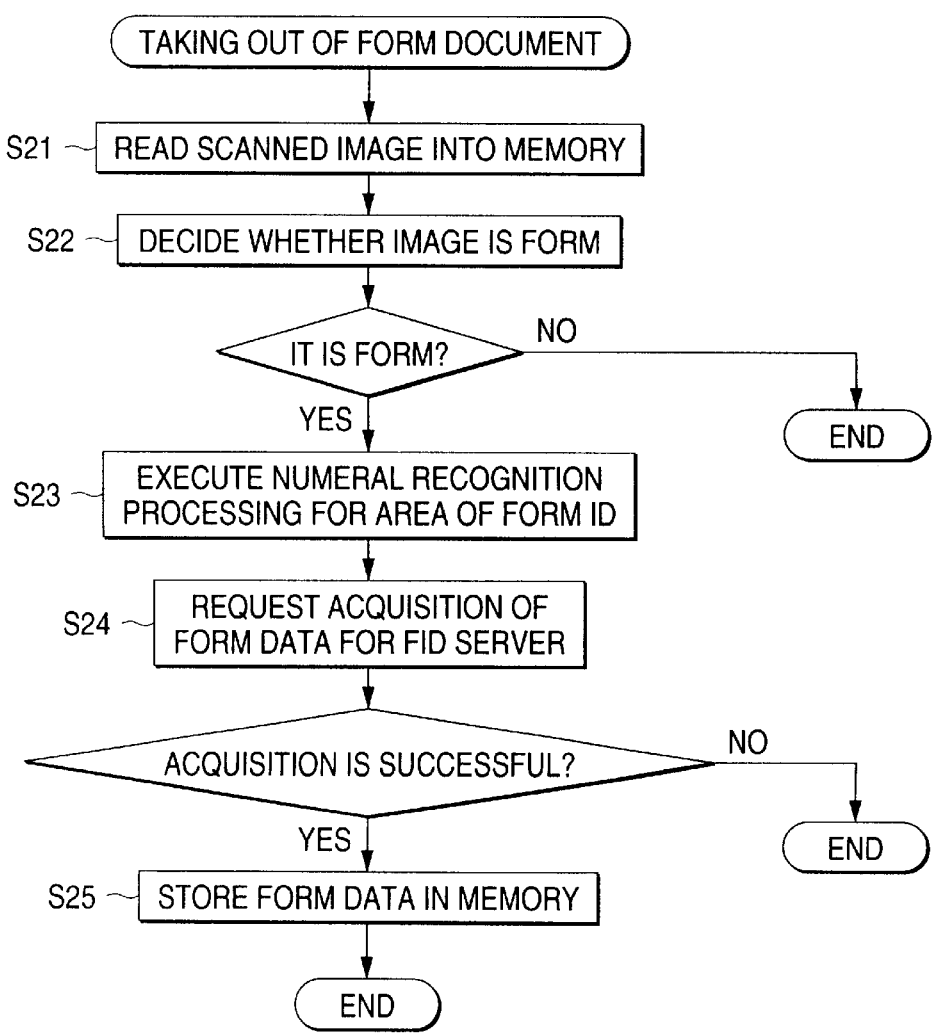
FIG. 4 is a flowchart showing the details of processing of taking out of a form document.

The details of step S2 are shown in FIG. 4. As shown in FIG. 4, the scan image acquired by the scan server 54 is read into the work area of a memory (S21), and it is decided whether the image data represents a form (i.e. the input sheet has been read) (S22). Namely, the form decision section 52 visually recognizes the four corners of the scan image to examine whether a logo or registration mark (see FIG. 1) is s present at each corner. When the logo or registration mark is present at each corner, it is decided that the scan image at issue represents a form.

When it is decided that the scan image does not represent a form, no processing will be executed for the scan image.

On the other hand, when it is decided that the scan image represents a form, the numeral recognition processing for a form ID area is executed to extract the value of a form ID (S23). The form decision section 52 informs an FID server 56 of the extracted form ID value to require that the FID server 56 acquires the form document data corresponding to the form ID (S24). The FID server 56 retrieves the form DB 20 to take out the form document data corresponding to the form ID and loads it onto the work area of the memory (S25).

The form document data thus obtained as well as raw scan image data are supplied to an input processing section 58.

The input processing section 58, which constitutes a core of executing the form processing in the present system, includes two sub-sections of a form document synthesizing section 60 and a processing interpreter 62. The form document synthesizing section 60 serves to execute the processing of step S3 in FIG. 3 and the processing interpreter 62 serves to execute the processing of step S4. The processing procedure of the form document synthesizing section 60 and the processing interpreter 62 will be explained in order.

Figure 5:
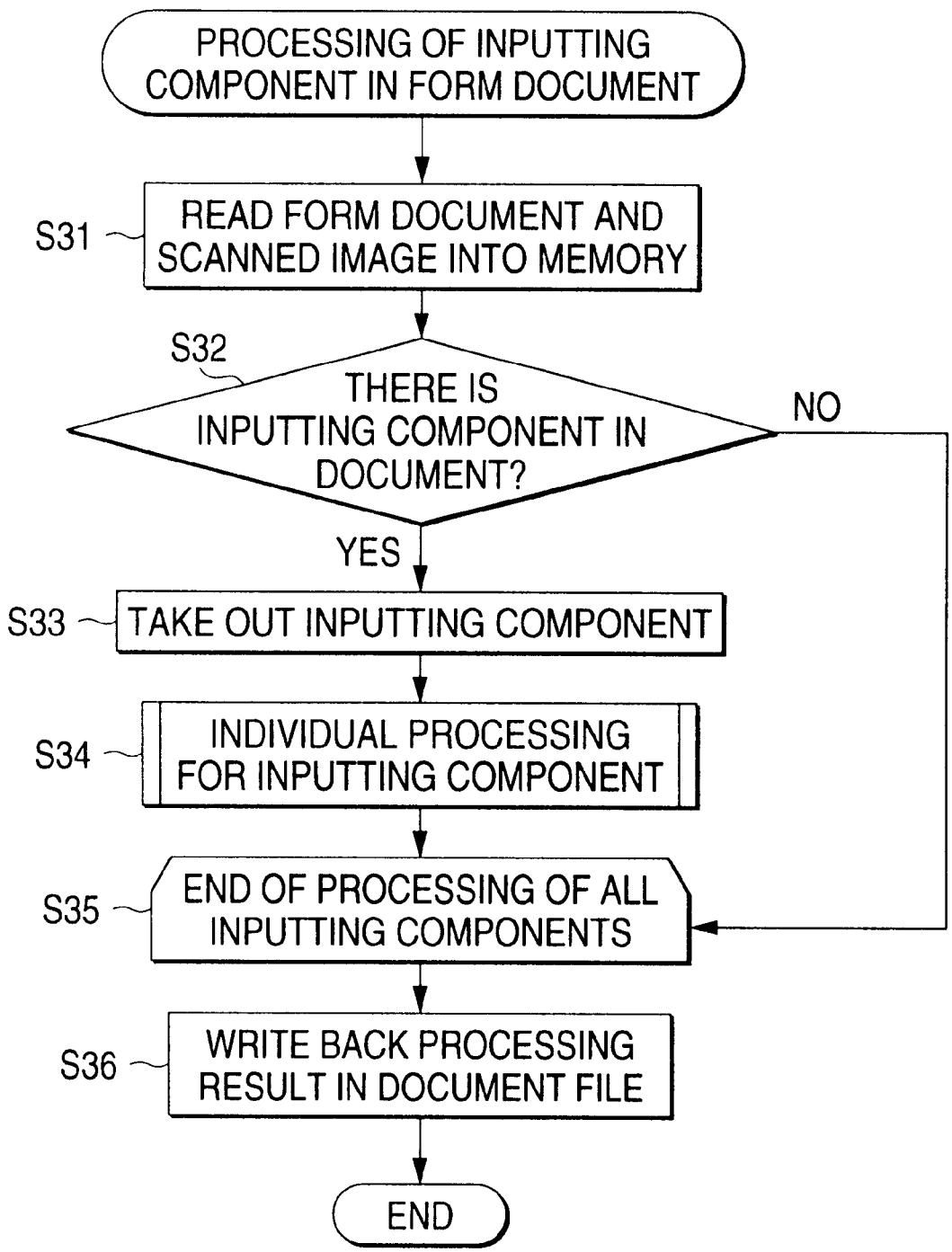
FIG. 5 is a flowchart showing the details of processing of an inputting component in the form document.

FIG. 5 is a flowchart showing the details of the processing of the inputting components within a form document. The form document synthesizing section 60 reads the scan image obtained in step S1 and the form-document data obtained in step S2 in the work area of the memory (S31). The form document synthesizing section 60 decides whether an inputting component is included in the form document data (S32). If the answer is "YES", the component is taken out from the component library (S33). The component is actuated to execute acquisition of the user's fill-in contents (individual processing of the inputting component) (S34). Then, the form document synthesizing section 60 retrieves the inputting component from the route of the document structure of the form document data reflexively and actuates the component whenever it is found, thereby causing the component to execute its individual processing (see the form document data 200 in FIG. 1). As described previously, each inputting component has a function of acquiring the user's fill-in contents by image recognition (i.e. having a program of executing such a function) and also has information representative of where the inputting frame corresponding to each component is located on the input sheet. For this reason, the form document synthesizing section 60 has only to actuate the inputting component so that the inputting component can acquire the user's fill-in contents on the input sheet using the information possessed by itself.

Figure 6:
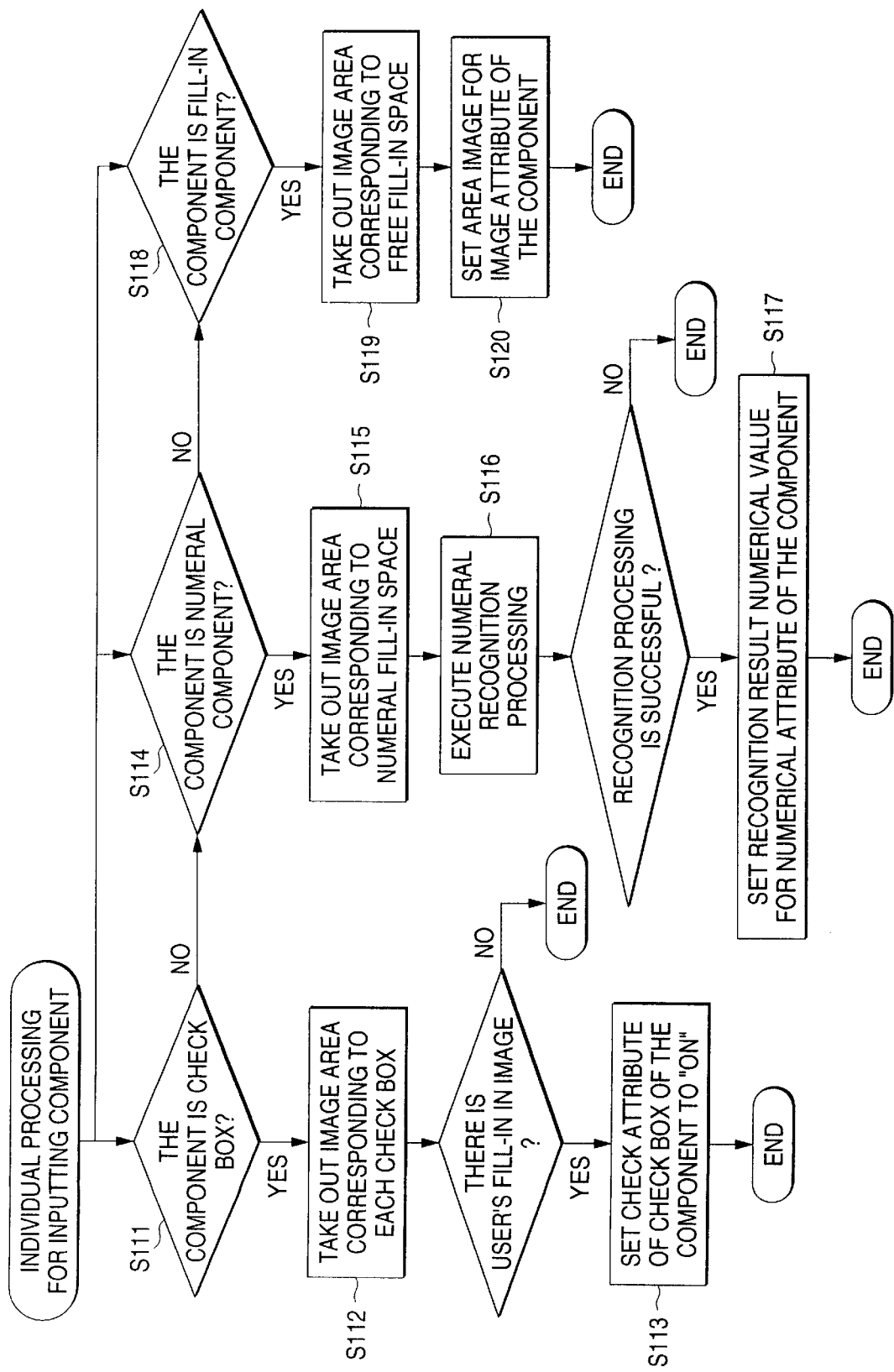
FIG. 6 is a flowchart showing the details of individual processing of the inputting component.

FIG. 6 shows the detailed procedure of the individual processing (S34) of each inputting component. As seen from FIG. 6, it is decided whether the component at issue includes a check box (or check dot), a numeral fill-in component or a free fill-in component (S111, S114, S118). If the component includes the check box (or check dot), the check box of the component is actuated to take out the image area corresponding to each check box on the scan image, thereby executing image recognition (S112). As a result, if there is a user's fill-in on the image area corresponding to the check box, the check attribute of the check box is set to "ON" (S113). If there is no user's fill-in on the corresponding image area, the check attribute is kept "OFF".

If the inputting component includes the numeral fill-in component, the numeral fill-in component is actuated. The numeral fill-in component takes out the image area corresponding to the numeral fill-in space on the scan image (S115) and performs the numeral recognition processing for the area (S116). If the recognition processing is successful, the value of the recognition result is set for the numeral attribute of the numeral recognition component (S117).

If the inputting component includes the free fill-in component, the free fill-in component is actuated. The free fill-in component takes out the image area corresponding to the free fill-in space on the scan image (S119), and the image data itself of the image area is set for the image attribute of the free fill-in component (S120).

After the above recognition processing has been completed for all the inputting components included in the form document (S35), the processing result is written back in the document file (S36).

As a result of the above processing, the user's fill-in result is set for the attribute of each inputting component of the form document. Specifically, the processing of step S3 is to synthesize the user's fill-in result on the input sheet 300 with the electronic form document 200 which is the original data of the input sheet 300 to create an electronic form document 250 reflecting the user's fill-in result.

Figure 7:
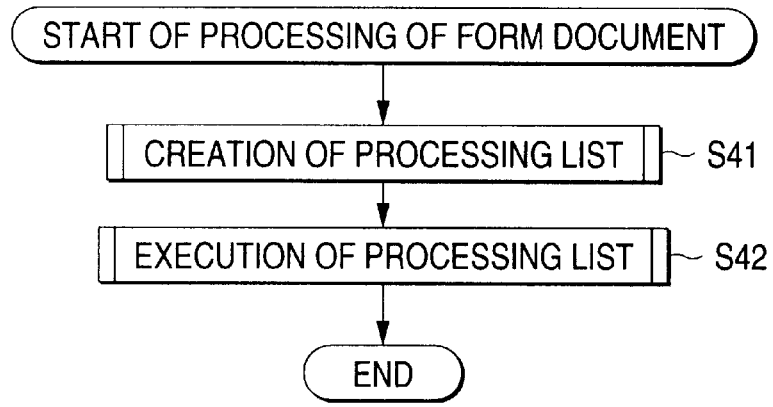
FIG. 7 is a flowchart showing the procedure of processing of the form document.

In the processing in the processing interpreter 62 in step S4, information processing is executed with reference to the electronic form document 250 reflecting the user's fill-in result. In step S4, as shown in FIG. 7, the processing interpreter 62, referring to the electronic form document 250, creates a processing list which defines the processing order and input/output relationship of the respective system functional components (S41), and executes the processing of each system functional component on the basis of the processing list (S42).

Figure 8:
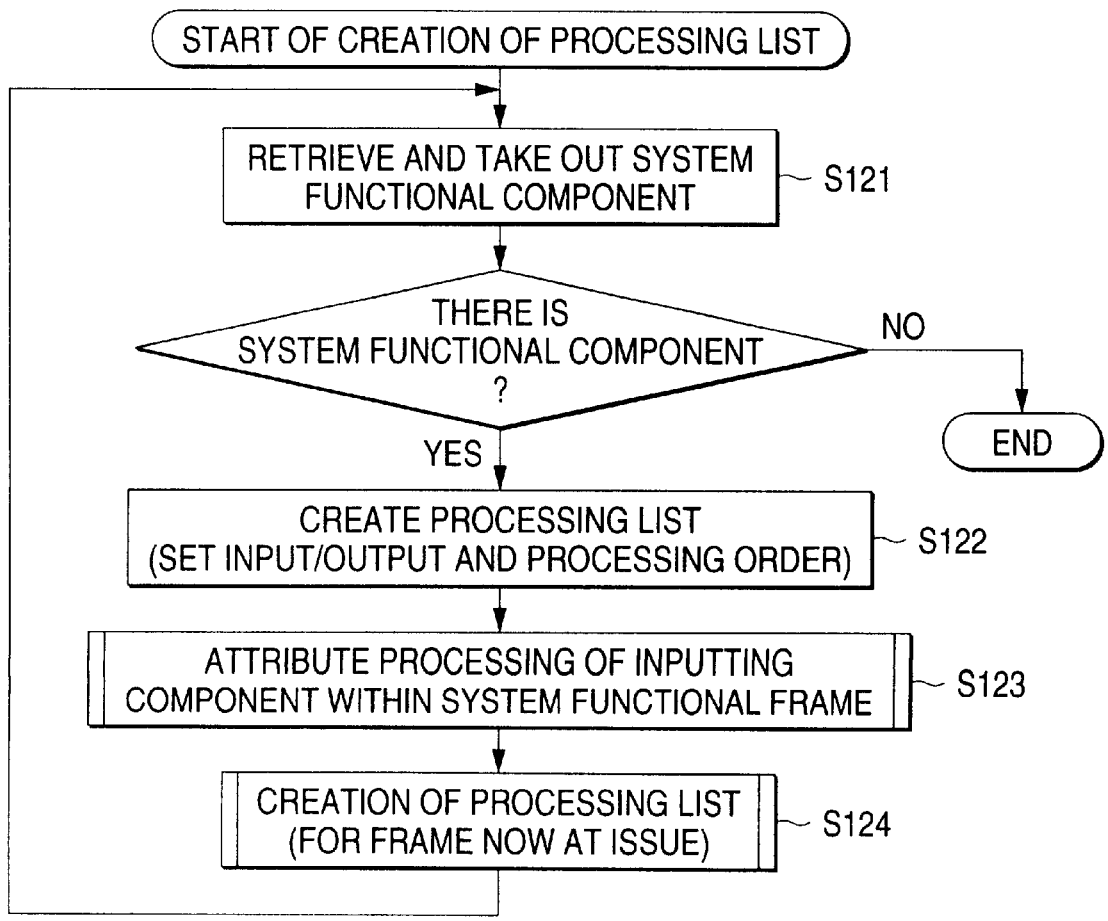
FIG. 8 is a flowchart showing the details of processing of creation of a processing list.

FIG. 8 shows the detailed procedure of creating the processing list (S41). As seen from FIG. 8, the processing interpreter 62 retrieves system functional components in order from the route in the tree structure for the data of the electronic form document 250 (S121). If a certain system functional component- is found, it is added to the processing list (S122). The user's fill-in value is set for the system functional component (S123). Specifically, in step S3 described above, although the user's fill-in value was set as the attribute value of the inputting component, in step S123, it is coupled with the processing parameter. The details of the processing are shown in FIG. 9.

Figure 9:
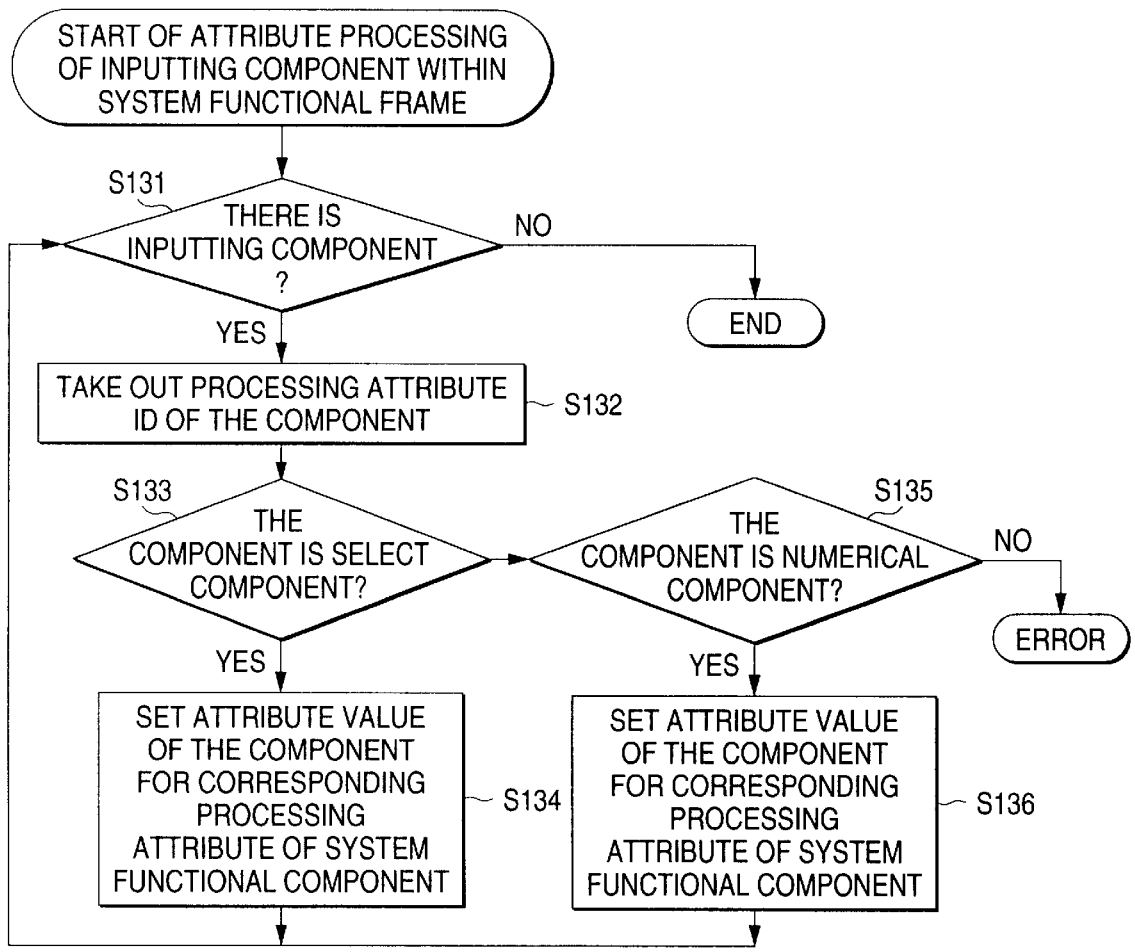
FIG. 9 is a flowchart showing the details of processing of processing attribute setting of the system functional component in creation of the processing list.

As seen from FIG. 9, on the basis of the information of the electronic form document, the processing interpreter 60 decides whether an inputting component is dependent on the system functional component (i.e., an inputting frame is located within the system functional frame) (S131). If there is no inputting component, the processing for the system functional component is completed. On the other hand, if there is an inputting component, the processing attribute ID set for the inputting component is taken out (S132). The processing attribute ID represents an identifier imparted to each processing parameter of a system functional component. This processing attribute ID which is information indicating which processing parameter of the system functional component corresponds to the inputting component is previously set for the inputting component. The processing interpreter 62 reads the processing attribute ID. If the inputting component is a select component including a check box or the like (S133), the processing interpreter 62 sets the select result value possessed by the inputting component for the processing parameter corresponding to the above processing attribute ID in the system functional component (S134). If the inputting component includes a numeral fill-in component (S135), the processing interpreter 62 sets the numeral recognition result value possessed by the inputting component for the processing parameter corresponding to the above processing attribute ID in the system functional component-(S136). Although not shown in FIG. 9, if the inputting component includes a free fill-in component, the processing interpreter 62 sets the image data (or pointer to the image data) possessed by the inputting component for the processing parameter corresponding to the above processing attribute ID in the system functional component. Through the attribute processing described above (S123), the instruction of the sheet user is set for the system functional component. Incidentally, the processing parameter having no corresponding inputting component of the processing parameters of the system functional component is set for a default value.

After registering of the processing list (S122) and attribute setting (S123) have been completed for the system functional component found in step S121, the same processing (S121–S123) is repeated for the lower level of the system functional component (i.e. interior of the system functional frame) (S124). Such processing is repeated in the searching procedure according to priority of depth in a tree structure of the form document data. Thus, after the processing list registering and attribute setting have been completed for all the system functional components included in the form document, information processing is actually carried out using this result (S41 of FIG. 7).

The input sheet 300 shown in FIG. 1 includes only one system functional component (only the printing component) so that the feature of the processing list is difficult to appear. Therefore, taking, as an example, an input sheet 400 including a plurality of system functional components shown in FIG. 11, the processing list will be explained.

Figure 11:
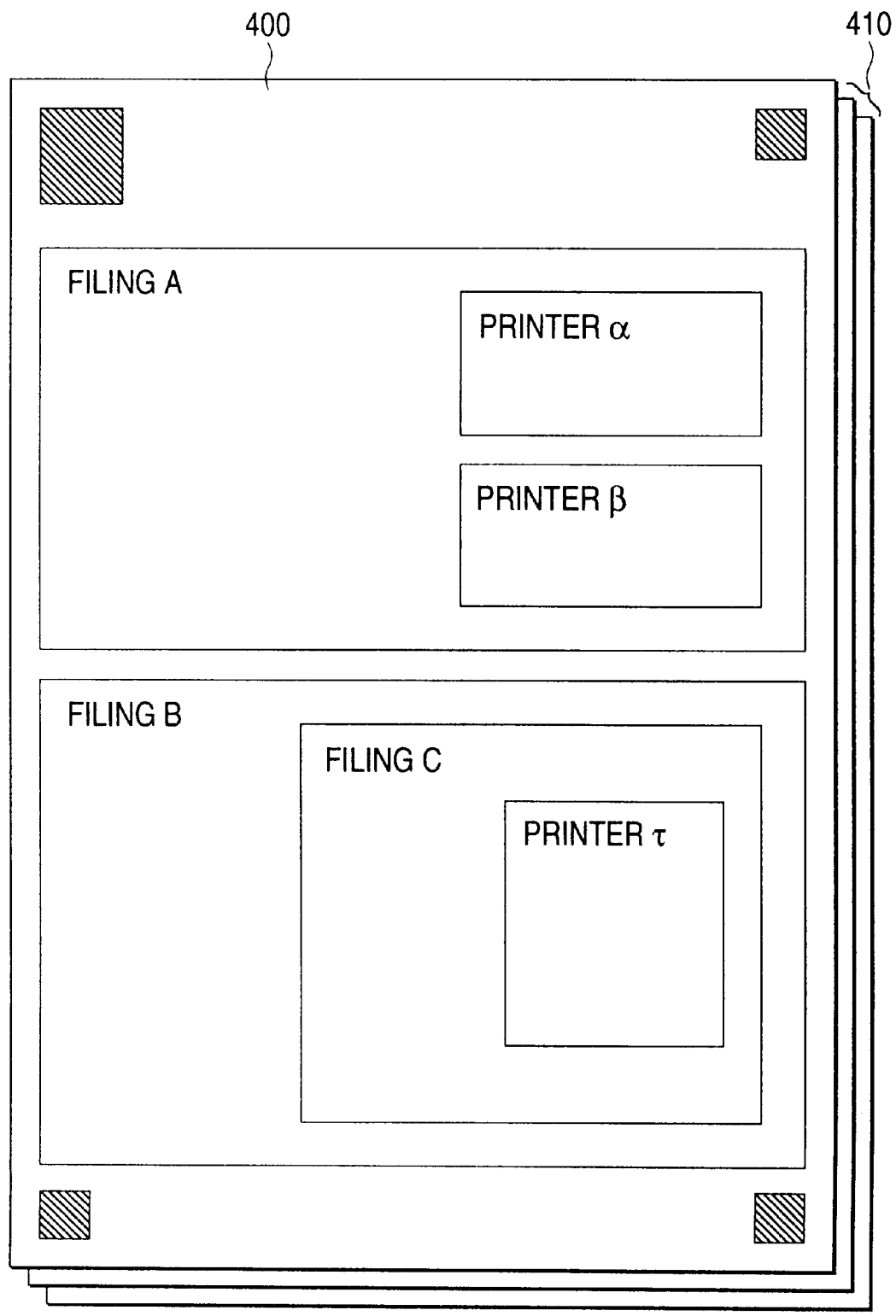
FIG. 11 is a view showing an example of the input sheet on which a plurality of system functional components are shown.

The input sheet 40 shown in FIG. 11 includes three filing frames (Filing A, Filing B, and Filing C) representative of different filing functions from each other and three printer frames (Printer α, Printer β, and Printer γ) representative of different printing functions from each other. It is assumed that the software component substance- corresponding to each frame has been registered in the component library. The form document corresponding to the input sheet 400 has a tree-shaped data structure as shown in FIG. 13. In the processing of creating a processing list (S41 of FIG. 7), the form document shown in FIG. 13 is searched from the route to retrieve a system functional component. As a result, the Filing A or Filing B is found (It is uncertain which is earlier found). Now assuming that the Filing A is earlier found, it is registered in the processing list. Since the Filing A is located right under the route, the highest priority in the processing order is given to the Filing A. This priority is also written into the processing list.

The input/output relationship of the Filing A is also described in the processing list. The input/output relationship, in a tree structure of the form document, is defined under the rule that the output from a system functional component is inputted to another system functional component dependent right under the former system functional component. Thus, basically, the form document has a structure in which a component for executing a function of data input (e.g. taking out a file from a file server) is located at the highest level and another component for processing the data received from the former component is located under the component. In the system according to this embodiment, it should be noted that if there is no data inputting functional component at the highest level of the form document, the document appended to the input sheet is interpreted as an input from the component at the highest level. In the example of FIG. 11, both the Filings A and B have no data inputting function, and a document 410 serving as input data is appended to the input sheet 400. Thus, the input from the Filing A is the appended document. As the output from the system functional component, an output destination or outputting format of the component is described. Namely, as the output from the Filing A, the format of the output data when the filing processing has been carried out is set.

After the Filing A has been registered on the processing list, the system functional component subordinate to the Filing A is retrieved. Through this retrieval, Printer a and Printer β are found (it is uncertain which is earlier found), and they are registered on the processing list. In this case, since the Printers α and β are subordinate to the Filing A, the priority succeeding to that of the Filing A is given to the Printers α and β, and the output from the Filing A is set as an input source. As an output destination of each printer component, the corresponding printer device is set.

In this way, the form document is reflexively searched from the route according to priority of depth in a tree structure of the form document data, and all the system functional components included in the form document are registered on the processing list.

FIG. 12 shows the contents of the processing list thus created. In FIG. 12, the processing order of the Filing A, for example, is A-1. This means that in the form of FIG. 13 there are two components (Filing A and Filing B) at the highest level, either of which may be earlier executed so that the Filings A and B are listed in parallel as series A and series B, respectively without giving the priority. Therefore, it is not certain which of the series A-1 and B-1 is earlier executed until when the individual processing is executed. But when the Filing A is earlier executed, the component having the priority of A-2 is executed subsequently to the processing of the Filing A. After all the components belonging to the series A have been processed, the -processing belonging to the series B is performed from the priority of B-1.

With respect to the input/output relationship of the Filing A in the processing list of FIG. 12, the appended document is set as an input and the format of output data when the filing processing has been performed is set as an output. As for the output format of the Filing A, this embodiment defines three functions of "store processing", "file list output processing" and "file take-out processing" as processing functions of the Filing A. Where the store processing and the file list output processing are performed, the list of the files stored in the file system is outputted in a predetermined format of list form. Where the file take-out processing is performed, the file taken out is outputted as document image data.

Figure 10:
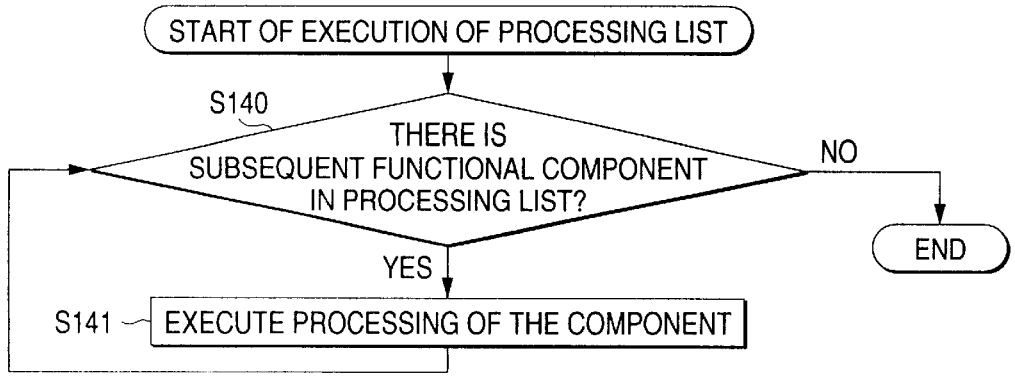
FIG. 10 is a flowchart showing the procedure of form document processing based on the processing list.

In this way, after the system functional components of the form document have been registered on the processing list and the processing parameters have been set, the processing of each system functional component is executed on the basis of the processing list (S42 of FIG. 7). FIG. 10 shows the concrete processing procedure of step S42. As seen from FIG. 10, the processing interpreter 62 retrieves a system functional component from the processing list (S140), and if the system functional component is found, actuates it. The system functional component performs the processing in accordance with the processing parameter set for itself (S141). In this case, the processing of each system functional component is executed along the processing order indicated on the processing list.

As regards the processing list shown in FIG. 12, for example, either the Filing A or B having the highest priority is processed. Assuming that the Filing A is processed earlier, the Printers α and β are processed not in order. Upon completion of the processing of-the series A, the Filing B is processed. Subsequently, the Filing C and Printer γ are processed in this order. In this way, all the system functional components included in the form document are processed.

The processing interpreter 62 actuates each of the system functional components along the procedure described above to execute the services 64-1 to 64-n provided by these system functional components successively. Depending on the function of a system functional component, a new form document 260 reflecting the execution result of the function may be created. The new form document 260 thus created is stored in the form DB 20 and printed out if required.

In this embodiment, when the apparent image of the input sheet form is created, the form document defining both the appearance of the form and processing procedure is automatically created. For this reason, creation of the program for defining the processing procedure is not required. When the input sheet with the user's fill-in made is to be processed, the processing order and input/output relationship of each software component on the basis of the data included in the corresponding form document are determined, and the input sheet is processed in accordance with the processing order and input/output relationship thus determined.

The explanation hitherto made was directed to the case where the input sheet is mainly printed out on paper. But this embodiment is efficient for the case where the input sheet is displayed on a display device. In this case, the sheet user fills in necessary items using a mouse or key board in place of writing implements. The input sheet thus filled out is directly taken into an input sheet system as electronic data. The succeeding processing is the same as the case of using a paper input sheet.

In the explanation hitherto made, the input sheet was used as an instruction inputting document for the service processing function provided by the present input sheet system, but it may be only used as a data inputting medium such as a mark sheet. Such an example of the input sheet includes a slip and a questionnaire. An explanation will be given of an example in which the input sheet is used as the slip or questionnaire.

The input sheet system according to this embodiment, which creates the form by assembling the symbols of the software components as described above, can take the document created by an existing word processor into the form so as to change the design and layout of the form very flexibly. Specifically, in this embodiment, the document of a slip or questionnaire made by the word processor is read into a form editor as a base, and the inputting component having a function of visually recognizing user's fill-in contents is applied onto the base to create the form of the slip or the like. An inputting component can be applied to a blank form image and an explanation or comment sentence can be added to the inputting component. The inputting component may be a check box component, a check dot component, a numeral fill-in component, a free fill-in component, etc. In any way, the form such as the questionnaire is regarded as a form with no system functional component. The data of the document created by the word processor can be taken into the form, as a "document component", separately from the data of the software component.

FIG. 14 shows an example of the questionnaire thus formed.

Such a form of the questionnaire or slip is printed out, for example, and supplied to a sheet user as an input sheet. The input sheet with the user's fill-in contents can be read into the input sheet system again using a scanner, thus acquiring the fill-in result by the sheet user. The processing procedure at this time is basically the same as in the case of the input sheet for instructing the print processing described above. Specifically, in this example, each inputting component included in the form of the questionnaire or the like visually recognizes the corresponding area of the input sheet image acquired by the scanner to acquire the fill-in result by the sheet user, and takes the acquired data as an attribute value therefor. As a result of this processing, the original electronic form document with no fill-in is regenerated in such a manner that the fill-in result by the sheet user is taken as electronic data. Additionally, it should be noted that the processing of the form of the questionnaire or the like is completed at the step of acquiring the fill-in result (corresponding to step S3 of FIG. 3) and the processing (step S4 of FIG. 3) of the system service function based on the fill-in result is not carried out. The electronic form document thus regenerated has the fill-in result for each item of the questionnaire or the like in a manner such as a numeral code chain, character code chain, ON/OFF attribute of the checking, etc. which can be directly processed by a computer, thus making totaling easy.

Figure 15:
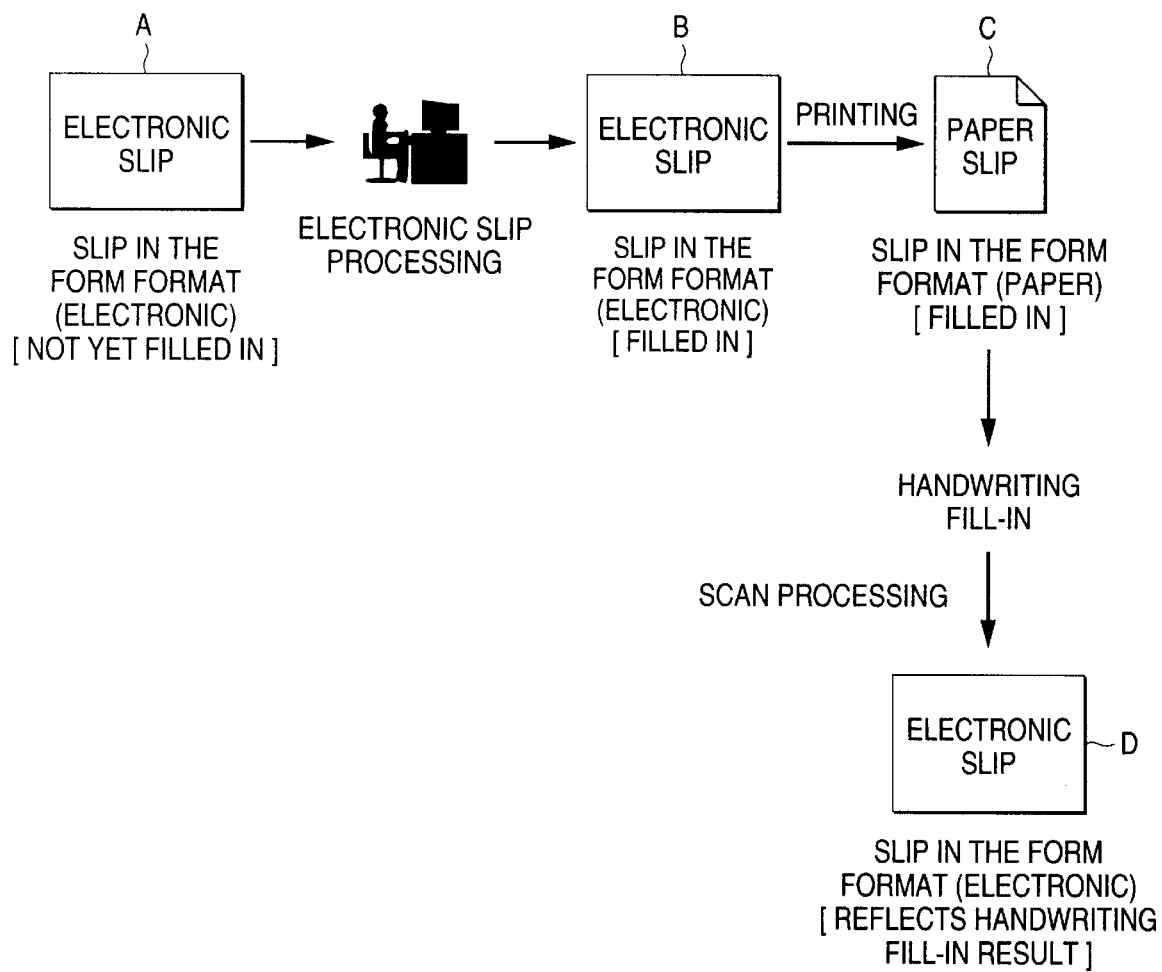
FIG. 15 is a view explaining the flow of slip processing when the form according to an embodiment is applied to a slip.
Figure 16:
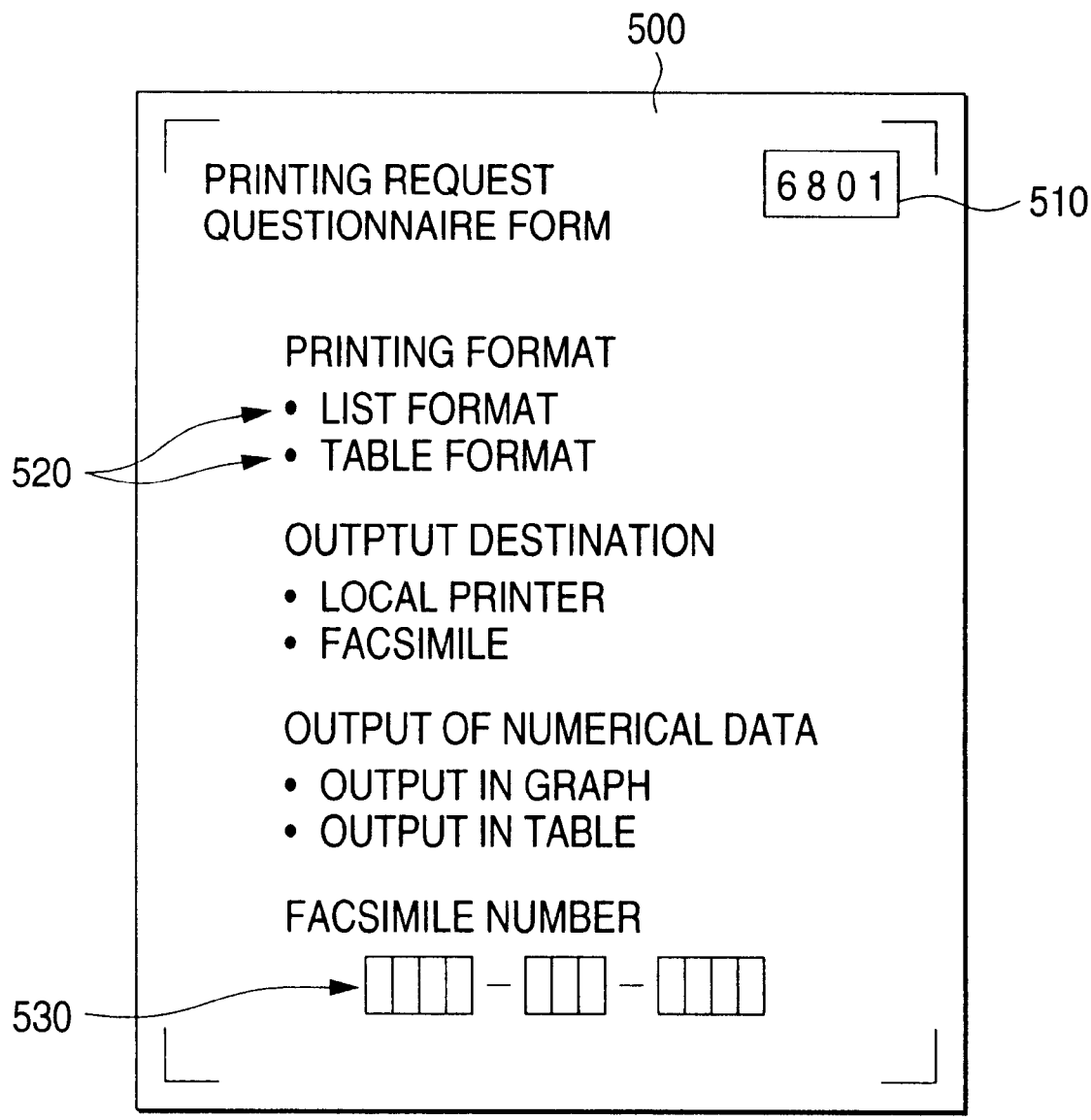
FIG. 16 is a view showing the form of an instruction document for inputting used in a conventional information inputting device.

Thus, the form of the questionnaire or slip created according to this embodiment permits the check or fill-in by electronics and that by writing implements to be dealt entirely equally. This will be explained- with reference to FIG. 15 which shows the case where two stages of fill-in by electronics and writing implements are carried out for the form of the slip created according to this embodiment. Specifically, as seen from FIG. 15, an electronic form document (electronic slip) A with no fill-in is read by a computer, and the fill-in for each inputting component is carried out by electronic slip processing. As a result, an electronic slip B holding the electronic fill-in result as an attribute of the inputting component is created. The electronic slip B having the fill-in result is printed out as a paper slip C which is supplied to e.g. a manager. The person having the paper slip C received fills in matters such as an approval or comments on the paper slip by handwriting. The paper slip having the fill-in by handwriting is taken into-the system by a scanner again. The matters handwritten are converted into electronic data by the fill-in result acquiring processing described above. Finally, an electronic slip D including two stages of fill-in results by electronics and handwriting can be completed. In this way, FIG. 15 shows the flow of slip processing in which the slip is transferred in a suitable manner such as electronic data or printed paper if required.

In this way, this embodiment permits both the fill-in results for the same form by electronics and handwriting to be dealt with entirely equally. Thus, in accordance with this embodiment, it is possible to provide the input sheet in the manner (representation of paper or display) desired by a sheet user and unitarily process the fill-in results for the sheet (e.g. totaling).

As described above, in accordance with the present invention, the appearance of a form has only to be edited by arrangement of the symbols of software components registered in a library so that the functional coupling (subordinate relationship) among the software components is automatically defined by the location relationship of the symbols. Thus, by processing each software component on the basis of the above subordinate relationship, the input sheet can be processed in accordance with the inputs by a user. Accordingly, the user can executes the inputs using the form by only creating the appearance of the form, without separately creating the program for processing the form.

What is claimed is:

1. An input sheet creating and processing system for user input information, comprising:
   a library of function executing software components each represented by a symbol;
   means for creating an input sheet form by selecting and positioning symbols representing software components to be used for processing the input sheet to be created;
   means for registering the created input sheet form in a form database;
   means for creating an input sheet based on data corresponding to the registered input sheet form;

means for reading the input sheet after modification thereof by user input information and for providing an image of the read input sheet;

means for retrieving from the form data base the registered input sheet form corresponding to the read input sheet by analyzing the image of the read input sheet;

means for obtaining the user input information on the read input sheet by analyzing the image thereof;

means for acquiring a subordinate relationship among the software components according to symbol location on the input sheet form; and means for processing the user input information in accordance with the subordinate relationship.

2. The input sheet system according to claim 1, wherein the symbol of each of the software components has a frame, and said input processing means acquires the subordinate relationship among the software components on the basis of a location relationship among the frames.

3. The input sheet system according to claim 2, wherein said input processing means acquires the subordinate relationship among the software components on the basis of an inclusion relationship among the frames.

4. The input sheet system according to claim 2, wherein said input processing means acquires the subordinate relationship among the software components on the basis of an overlapping relationship among the frames.

5. The input sheet system according to claim 1, wherein each of the software components includes an inputting component and a system functional component, and said input processing means uses an output from an inputting component subordinate to the system functional component as a parameter for executing a function of the system functional component.

6. The input sheet system according to claim 1, wherein each of the software components includes an inputting component and a system functional component, and said input processing means, where another system functional component is subordinate to the system functional component at a higher level as an input to the system functional component at a lower level.

7. The input sheet system according to claim 1, wherein said form registering means appends an identifier to the form to be registered, said input sheet creating means creates an input sheet including an indication of the identifier of the form, and said form decision means decides a form corresponding to the input sheet on the basis of the indication of the identifier of the form.

\* \* \* \* \*